May 4, 1948.  P. H. THOMPSON  2,440,987
FLOAT SWITCH
Filed June 8, 1945

Parke H. Thompson,
Inventor.
Haynes and Koenig,
Attorneys.

Patented May 4, 1948

2,440,987

UNITED STATES PATENT OFFICE 2,440,987

FLOAT SWITCH

Parke H. Thompson, Kirkwood, Mo., assignor to AMP Corporation, St. Louis, Mo., a corporation of Missouri Application June 8, 1945, Serial No. 598,240

8 Claims. (Cl. 200—84)

This invention relates to switches, and with regard to certain more specific features, to magnetic float switches for liquid level control.

Among the several objects of the invention may be noted the provision of a compact snap-acting liquid-level float switch of the magnetic type which is substantially unaffected by acids, rust, scale or the like, thereby insuring a long trouble-free operating life; the provision of a liquid-level float switch which may readily be adjusted for various level differentials and mean liquid levels; the provision of a float action switch wherein the float friction is reduced to a minimum; and the provision of a reliable switch of this class having few and simple parts which may be easily manufactured and assembled at low cost. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a sectional view in a low-level, "on" position of the switch;

Similar numerals indicate corresponding parts throughout the several views of the drawings.

Figure 1:
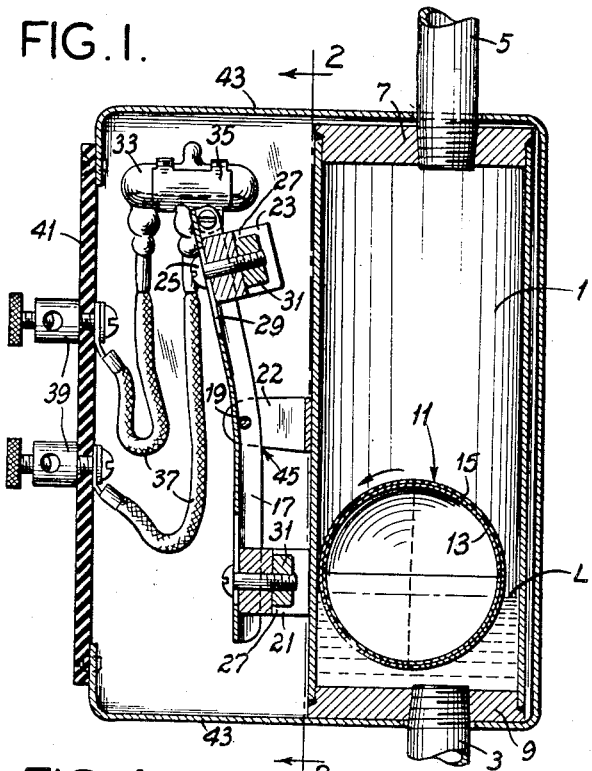

Referring now more particularly to the drawings, numeral 1 indicates a float cylinder having a lower inlet pipe 3 and an upper outlet pipe 5 attached to ends 9 and 7, respectively. Since the switch of the present invention is especially for use in carbonating systems and other liquid systems wherein the parts are subjected to acid corrosion, rust and scale formation, the pipes 3 and 5 are preferably made of tinned copper. The cylinder 1 is preferably made of stainless steel which has a very low magnetic coefficient, or of non-ferrous, non-magnetic material. The cylinder 1 is provided with non-corroding welded ends 7 and 9 into which the pipes 3 and 5 are threaded. Internally the chamber 1 is provided with a float 11 which is in the shape of a hollow sphere. The float 11 may be constructed in various ways but in the present showing it consists of an inner hollow sphere 13 of highly magnetic soft iron (made in halves and seam welded about its circumference) and an outer hollow sphere 15 of stainless steel welded in the same manner and closely fitting the inner sphere. The circumferential seams of the two spheres are preferably at right angles to one another.

The soft iron inner sphere is employed because of its high magnetic qualities while the outer stainless steel sphere resists corrosion. Protection for the inner iron sphere may be obtained by silver or gold plating its exterior, or equivalent protective means may be used. The finished sphere 11 need not be perfect in roundness but it should be essentially spherical. It is of such a size that it may rotate freely with some clearance while floating on liquid L in the chamber 1.

The wall thicknesses of the spheres 13 and 15 are determined by the pressure in the system but they are made as light as possible consistent with the required strength. This is to obtain maximum buoyancy of the float. For high-pressure systems the float is provided with an internal pressure above atmospheric. This enables the float to withstand the pressures encountered without unduly increasing its wall thickness which favors a larger buoyancy. A spherical shape of course presents maximum strength for a given volume.

Figure 2:
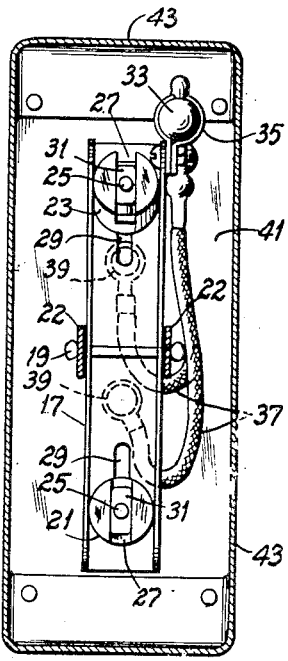
Fig. 2 is a vertical section taken on line 2—2 of Fig. 1.

A channeled lever 17 is pivotally mounted at 19 to a bracket 22 welded to the exterior of the cylinder 1. The lever 17 is of non-magnetic material and is mounted in a plane including the axis of the cylinder 1. The lever 17 is freely pivoted to the bracket 22 and has a permanent magnet 21 mounted near its lower end and a second permanent magnet 23 at its upper end. These magnets 21 and 23 are of the high-magnetic, so-called Alnico type and are adjustably mounted by screws 25 in slots 29 extending longiudinally near the ends of the lever 17. Referring to Fig. 2, it will be seen that the magnets 21—23 are round in cross section and provided with pole-forming slots 27 which also retain flat nuts 31 on ends of bolts 25.

On the upper end of the lever 17 is mounted a mercury switch 33 held in a spring mounting clip 35. Flexible wires 37 lead from the switch 33 to connecting posts 39 on an insulated wall portion 41 of a housing box 43.

The lever 17 is slightly angular as indicated at 45. This is to provide for a rocking motion about the pivot 19. The lever 17 is stable in either its Fig. 1 or Fig. 4 position, even under some vibration. In either position the over-centered moment of the upper magnet 23 and switch preponderates over the lesser moment of the lower parts including magnet 21. The wires 37 are flexible enough not to interfere with this over-centering stability.

The operation is as follows:

Assume that the switch 33 is in circuit with a motor driving a pump for maintaining a liquid level in a reservoir such as a carbonating system, and that the mid-point of the cylinder 1 is located at the level to be approximated. Pipe 3 connects to the bottom of the reservoir below said level and pipe 5 to its top and above said level. From a low level, "on" position of Fig. 1 the pump supplies liquid to the reservoir and hence to the lower pipe 3 and float chamber 1, because under these conditions the lower magnet 21 is attracted to the side of the chamber by the lowered magnetic float 11. This causes the upper end of lever 17 with the switch 33 to be swung away from the chamber and the mercury switch goes into its "on" position.

Figure 3:
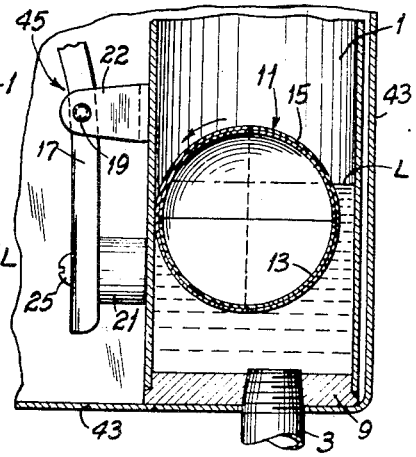
Fig. 3 is a partial section similar to Fig. 1 but showing a rising action of the float from its Fig. 1 position.

As the liquid rises in the float chamber 1, see Fig. 3, the spherical float will roll up the side of the chamber while still in the magnetic field of magnet 21. As it leaves the field of the magnet the downward bias of the attraction tends to sink the float, thus increasing its buoyant force (Fig. 3). At some point this force overcomes the magnetic force and the float will bob up or break away from the magnetic field. It should be recalled later that the reverse action takes place upon descent. The lever 17 maintains the Fig. 3 stable position after the break-away and hence the switch 33 remains closed and the liquid-supplying pump continues to operate.

Figure 4:
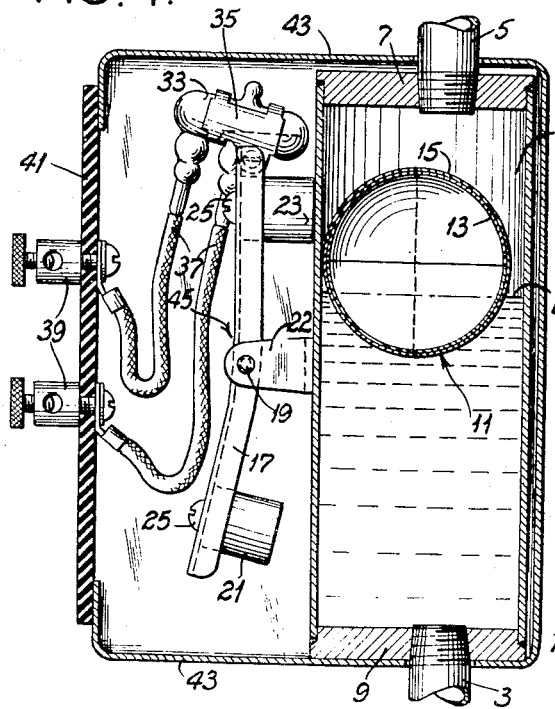
Fig. 4 is a view similar to Fig. 1 but showing a high-level, "off" position of the switch.

Continued rising of the liquid L will carry the float to the Fig. 4 position where the float has entered the magnetic field of the uppermost magnet 23 and has attracted the magnet 23 to the extent that the lever 17 is swung over center on its pivot 19. The mercury switch then moves into its "off" position. As the pump motor circuit is now disconnected the liquid level ceases to rise. This action occurs quite suddenly. In its travel the float is quite free to move up through the cylinder 1, rolling when necessary on its side wall. As the float approaches its uppermost position there is an upwardly biased magnetic pull which tends to raise it, thus reducing its buoyancy. This accelerates the approach of the float to the upper position in which it will influence the upper magnet 23 to open the switch 33. Hence there is an anticipation of the switch operation with respect to what it would be if the float buoyancy were not reduced at the upper end of its travel. This is one factor in producing a device having a lower level differential than former devices.

When the liquid lowers from the Fig. 4 level the float will again come into the lower magnetic field. At a certain level the magnetic field will reduce the buoyancy of the float and tend to sink it lower into the liquid. This causes the float suddenly to attract the lower magnet 21 and swing the lever 17 to cause the switch 33 to assume its "on" position, thereby restarting the pump motor. In this case again there is an anticipation of the switch operation with respect to what it would be if the buoyancy were not reduced at the lower end of the float travel. This is the second factor in reducing the level differential of the device.

Thus an accelerated movement is imparted to the float by the magnetic fields at each end of its travel, causing a level anticipating snap-action for both "on" and "off" positions of the switch 33.

The composition of the above-mentioned material of the float, that is, a stainless steel outside cover and a soft iron inside component, produces a float which is rust-proof and acid-resistant while at the same time possessing high magnetic quality. Other equivalents may be used for the purpose. There are no appendages attached to the float, thus allowing it to move and roll if necessary in the cylinder 1 with a minimum of friction.

The level differential is somewhat less than the distance between the centers of magnets 21 and 23. This differential may be changed by loosening the adjusting bolts 25 and moving the magnets closer or farther from the pivot 19 along the adjusting slots 29 provided for this purpose. The mean level may be changed by adjusting only one or the other of the magnets. The switch 33 could obviously be reversed in the clip 35 to provide a reverse action of the device, that is, the switch could be "off" when the float is in low-level position and "on" in high-level position.

By using a simple free rolling sphere as a floating armature and a cylindrical float chamber of a diameter to provide for guiding and rotation of the float, all without appendages such as float guide rods, plungers, etc., a reliable, trouble-proof construction is obtained. The simple magnetic sphere acts as the armature and may assume a rolling action upon the inner wall of the float chamber when coming into or out of the magnetic fields. Thus the chances of binding or sticking are minimized.

It is to be understood that the invention is applicable to control liquid levels in various classes of equipment such as carbonators, boilers, water supply systems, refrigerator systems, etc.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A liquid-level control comprising a liquid compartment having a wall, a float formed of magnetically attractable material freely disposed within said compartment next to said wall, a lever disposed outside said wall, and magnets located on said lever, a switch movable between on and off positions by the alternate movement of the magnets to and from the wall by the lever, said float being operative as an armature to draw toward the wall one or the other of said magnets depending upon the elevation of the float.

2. A liquid-level control comprising a liquid compartment having a substantially vertical wall, a free magnetically attractable float operative substantially vertically in said compartment next to said wall, a lever disposed outside said wall, magnets located spacedly on said lever, a switch movable between on and off positions by the movement of the lever produced by the alternate movement of the magnets to and from the wall said float being operative as an armature to draw toward the wall one or the other of said magnets when in a position adjacent to one or the other respectively, the float having a travel between said positions in which the magnets are unmoved, said coupling means having two positions of equilibrium in each of which a different magnet is positioned toward the wall.

3. In a liquid-level switch, a substantially vertically disposed liquid compartment comprising a substantially non-magnetic cylinder, a float formed of magnetically attractable material and being arranged for free floating vertical movement in said cylinder, a substantially vertically disposed rocker outside of said cylinder, magnets carried respectively toward the lower and upper ends of said rocker, a gravity operated switch carried by the rocker and movable to on and off positions in alternative positions of said rocker, said float in one of its lower positions being adapted to attract the lower magnet and in one of its upper positions to attract the upper magnet, said rocker having different positions of stable equilibrium according to the attracted position of either magnet.

4. A liquid-level control comprising a liquid compartment having a wall, a free floating magnetically attractable float disposed vertically in said compartment next to said wall, a lever disposed outside said wall, magnets located at either end of said lever, and a switch movable between on and off positions by movement of the lever produced by the alternate movement of the magnets to and from the wall said float being operative as an armature to draw toward the wall one or the other of said magnets depending upon the elevation of the float, the arrangement being such that the armature float in approaching the lower magnet is temporarily depressed from its normal floating position in the liquid and in approaching the upper magnet is temporarily raised in the liquid from its normal floating position.

5. In a liquid-level switch, a substantially vertically disposed liquid compartment comprising a cylinder having a substantially vertical non-magnetic side wall, a free-floating magnetically attractable ball disposed within and adapted to roll vertically up and down along said side wall of said cylinder a lever vertically disposed outside the cylinder, and magnets located one above the other on said lever, said magnets being alternatively movable to and from the cylinder for actuating said lever, said ball in one of its lower positions being adapted to attract the lower magnet and in one of its upper positions to attract the upper magnet, said coupled magnets having positions of stable equilibrium, the arrangement being such that the ball in approaching the lower magnet is temporarily depressed in the liquid from its normal floating position and in approaching the upper magnet is temporarily raised in the liquid from its normal floating position.

6. In a liquid-level switch, a substantially vertically disposed liquid compartment comprising a substantially non-magnetic sealed cylinder, a spherical armature float formed of magnetically attractable material and disposed for free vertical movement in said cylinder, a substantially vertically disposed rocker outside of said cylinder, magnets carried respectively toward the lower and upper ends of said rocker, a gravity operated switch carried by the rocker and movable to on and off positions in alternative positions of said rocker, said float in one of its lower positions being adapted to attract the lower magnet and in one of its upper positions to attract the upper magnet, said rocker having different positions of stable equilibrium according to the attracted position of either magnet, at least one of said magnets being vertically adjustable on the rocker.

7. In a liquid-level switch, a substantially vertically disposed liquid compartment composed of a substantially non-magnetic cylinder, a float ball formed of magnetically attractable material and being slightly smaller in diameter than the diameter of the cylinder, said float ball being guided by and being free to rotate in the cylinder, a rocker arm pivoted at one side of the cylinder and rocking in a substantially vertical plane, magnets respectively attached toward the lower and upper ends of said arm, said arm being shaped for alternate movements of the magnets to and from the cylinder, a switch carried by the arm and adapted to be closed upon movement toward the cylinder of the lower magnet and opened upon movement toward the cylinder of the upper magnet, said float ball being adapted in a lower position to attract said lower magnet and in an upper position to attract said upper magnet.

8. In a liquid-level switch, a substantially vertically disposed compartment composed of a substantially non-magnetic cylinder, a float ball formed of magnetically attractable material and being slightly smaller in diameter than the diameter of the cylinder, said float ball being guided by but being free to rotate in the cylinder, a rocker arm pivoted at one side of the cylinder and rocking in a substantially vertical plane, magnets respectively attached toward the lower and upper ends of said arm, said arm being shaped for alternate movements of the magnets to and from the cylinder, a switch carried by the arm and adapted to be closed upon movement toward the cylinder of the lower magnet and opened upon movement toward the cylinder of the upper magnet, said float ball being adapted in a lower position to attract said lower magnet and in an upper position to attract said upper magnet, the arrangement being such that the float ball in approaching the lower magnet is by magnetic force temporarily depressed from its normal floating position in the liquid and in approaching the upper magnet is temporarily elevated in the liquid from its normal floating position.

PARKE H. THOMPSON.

REFERENCES CITED

The following references are of record in the file of this patent:

UNITED STATES PATENTS

| Number | Name | Date |
| --- | --- | --- |
| 355,815 | Ghegan | Jan. 11, 1887 |
| 2,116,415 | Shenton | May 3, 1938 |
| 2,204,161 | Shepherd | June 11, 1940 |